United States Patent
Safford et al.

(10) Patent No.: US 7,296,181 B2
(45) Date of Patent: Nov. 13, 2007

(54) LOCKSTEP ERROR SIGNALING

(75) Inventors: Kevin David Safford, Fort Collins, CO (US); Eric Richard Delano, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 554 days.

(21) Appl. No.: 10/818,993

(22) Filed: Apr. 6, 2004

(65) Prior Publication Data

US 2005/0240829 A1   Oct. 27, 2005

(51) Int. Cl.
*G06F 11/00* (2006.01)

(52) U.S. Cl. .............................. 714/11; 714/12; 714/49

(58) Field of Classification Search .................. 714/11, 714/12, 49
See application file for complete search history.

(56) References Cited

U.S. PATENT DOCUMENTS

| | | | |
|---|---|---|---|
| 4,785,453 A | 11/1988 | Chandran et al. | |
| 5,223,152 A | 6/1993 | Freymeyer et al. | |
| 5,276,823 A * | 1/1994 | Cutts et al. | 714/11 |
| 5,434,997 A | 7/1995 | Landry et al. | |
| 5,787,476 A | 7/1998 | Laudon et al. | |
| 5,948,111 A | 9/1999 | Taylor et al. | |
| 6,065,135 A | 5/2000 | Marshall et al. | |
| 6,182,195 B1 | 1/2001 | Laudon et al. | |
| 6,247,144 B1 | 6/2001 | Macias-Garza et al. | |
| 6,393,582 B1 * | 5/2002 | Klecka et al. | 714/11 |
| 6,473,869 B2 * | 10/2002 | Bissett et al. | 714/12 |
| 6,499,048 B1 | 12/2002 | Emrys | |
| 6,604,177 B1 | 8/2003 | Kondo et al. | |
| 6,615,366 B1 * | 9/2003 | Grochowski et al. | 714/10 |
| 6,625,749 B1 * | 9/2003 | Quach | 714/10 |
| 6,640,313 B1 | 10/2003 | Quach | |
| 6,751,698 B1 * | 6/2004 | Deneroff et al. | 710/317 |
| 6,820,213 B1 * | 11/2004 | Somers et al. | 714/11 |
| 7,017,073 B2 | 3/2006 | Nair | |
| 7,055,060 B2 * | 5/2006 | Nguyen et al. | 714/11 |
| 2001/0034824 A1 | 10/2001 | Mukherjee | |
| 2001/0034854 A1 | 10/2001 | Mukherjee | |
| 2002/0073357 A1 * | 6/2002 | Dhong et al. | 714/19 |
| 2002/0133745 A1 | 9/2002 | Okin | |
| 2002/0144177 A1 | 10/2002 | Kondo et al. | |
| 2002/0152418 A1 * | 10/2002 | Griffin et al. | 714/11 |
| 2002/0152420 A1 * | 10/2002 | Chaudhry et al. | 714/11 |
| 2003/0005380 A1 * | 1/2003 | Nguyen et al. | 714/736 |
| 2003/0126409 A1 | 7/2003 | Juan et al. | |
| 2005/0108509 A1 | 5/2005 | Safford | |
| 2005/0240793 A1 | 10/2005 | Safford | |

FOREIGN PATENT DOCUMENTS

| | | |
|---|---|---|
| EP | 0201356 B1 | 11/1986 |
| WO | WO94/08293 | 4/1994 |
| WO | WO 02/084490 | 10/2002 |

* cited by examiner

*Primary Examiner*—Gabriel Chu

(57) ABSTRACT

Techniques are disclosed, for use in a computer system including a plurality of processing units coupled over a system fabric, to identify a lockstep error associated with a first packet to be transmitted over the system fabric; set a viral indicator in the first packet to indicate the lockstep error; and transmit the modified packet over the system fabric.

48 Claims, 11 Drawing Sheets

LOCKSTEP ERROR SIGNALING

CROSS REFERENCE TO RELATED APPLICATIONS

This application is related to the following concurrently-filed and commonly-owned patent applications, which are hereby incorporated by reference:

"Core-Level Processor Lockstepping," Ser. No. 10/818,975;

"Architectural Support for Selective Use of a High-Reliability Mode in a Computer System," Ser. No. 10/819,241;

"Voltage Modulation for Increased Reliability in an Integrated Circuit," Ser. No. 10/818,974;

"Lockstep Error Signaling", Ser. No. 10/818,993; and

"Off-Chip Lockstep Checking", Ser. No. 10/818,994.

BACKGROUND

The present invention relates to microprocessor design and, more particularly, to techniques for signaling errors in computer systems which implement lockstepping.

Cosmic rays or alpha particles that strike a silicon-based device, such as a microprocessor, can cause an arbitrary node within the device to change state in unpredictable ways, thereby inducing what is referred to as a "soft error." Microprocessors and other silicon-based devices are becoming increasingly susceptible to soft errors as such devices decrease in size. Soft errors are transient in nature and may or may not cause the device to malfunction if left undetected and/or uncorrected. An uncorrected and undetected soft error may, for example, cause a memory location to contain an incorrect value which may in turn cause the microprocessor to execute an incorrect instruction or to act upon incorrect data.

One response to soft errors has been to add hardware to microprocessors to detect soft errors and to correct them, if possible. Various techniques have been employed to perform such detection and correction, such as adding parity-checking capabilities to processor caches. Such techniques, however, are best at detecting and correcting soft errors in memory arrays, and are not as well-suited for detecting and correcting soft errors in arbitrary control logic, execution datapaths, or latches within a microprocessor. In addition, adding circuitry for implementing such techniques can add significantly to the size and cost of manufacturing the microprocessor.

One technique that has been used to protect arbitrary control logic and associated execution datapaths is to execute the same instruction stream on two or more processors in parallel. Such processors are said to execute two copies of the instruction stream "in lockstep," and therefore are referred to as "lockstepped processors." When the microprocessor is operating correctly (i.e., in the absence of soft errors), all of the lockstepped processors should obtain the same results because they are executing the same instruction stream. A soft error introduced in one processor, however, may cause the results produced by that processor to differ from the results produced by the other processor(s). Such systems, therefore, attempt to detect soft errors by comparing the results produced by the lockstepped processors after each instruction or set of instructions is executed in lockstep. If the results produced by any one of the processors differs from the results produced by the other processors, a fault is raised or other corrective action is taken. Because lockstepped processors execute redundant instruction streams, lockstepped systems are said to perform a "functional redundancy check."

One difficulty in the implementation of lockstepping is that it can be difficult to provide clock signals which are precisely in phase with each other and which share exactly the same frequency to a plurality of microprocessors. As a result, lockstepped processors can fall out of lockstep due to timing differences even if they are otherwise functioning correctly. In higher-performance designs which use asynchronous interfaces, keeping two different processors in two different sockets on the same clock cycle can be even more difficult.

Early processors, like many existing processors, included only a single processor core. A "multi-core" processor, in contrast, may include one or more processor cores on a single chip. A multi-core processor behaves as if it were multiple processors. Each of the multiple processor cores may essentially operate independently, while sharing certain common resources, such as a cache or system interface. Multi-core processors therefore provide additional opportunities for increased processing efficiency. In some existing systems, multiple cores within a single microprocessor may operate in lockstep with each other.

In existing systems for enabling multiple microprocessor cores to operate in lockstep, the microprocessor typically connects to a single system bus, a portion of which is shared by two or more lockstepped cores in the microprocessor. Because only one core can access the shared portion of the bus at a time in such systems, such systems typically include circuitry for arbitrating between the multiple cores and for multiplexing the data from the current "bus master" core onto the system bus. In such designs, the lockstep circuitry is typically implemented at these points of arbitration and multiplexing. Implementing lockstep circuitry in this way can be very difficult, particularly because the requirements of the bus architecture and protocol may leave very little time to perform lockstep checking. Furthermore, in such systems all data from the bus is duplicated before being transmitted to the lockstepped cores.

When a lockstep error is detected in a pair of lockstepped processor cores, it is desirable to notify the other processor cores in the system that such an error has been detected so that the other cores may disregard the output produced by the malfunctioning core or take other appropriate action. In a system in which all cores are coupled to a shared system bus, an error signal may be broadcast over the bus to all cores when a lockstep error is detected. In a link-based system, however, processor cores are connected in pairs over point-to-point links and there typically are no shared signals. As a result, typically it is not possible in such a system to use a single pin to broadcast an error message to all cores to notify them that a lockstep error has been detected. Instead, the component which identifies an error must signal the error over each point to point link, and each recipient of the error must then signal the error on each point to point link. Such error signaling can be inefficient and difficult to implement.

What is needed, therefore, are improved techniques for signaling errors in a computer system which implements lockstepping.

SUMMARY

Techniques are disclosed, for use in a computer system including a plurality of processing units coupled over a system fabric, to identify a lockstep error associated with a first packet to be transmitted over the system fabric; set a viral indicator in the first packet to indicate the lockstep error; and transmit the modified packet over the system fabric.

Other features and advantages of various aspects and embodiments of the present invention will become apparent from the following description and from the claims.

DETAILED DESCRIPTION

Figure 1A:
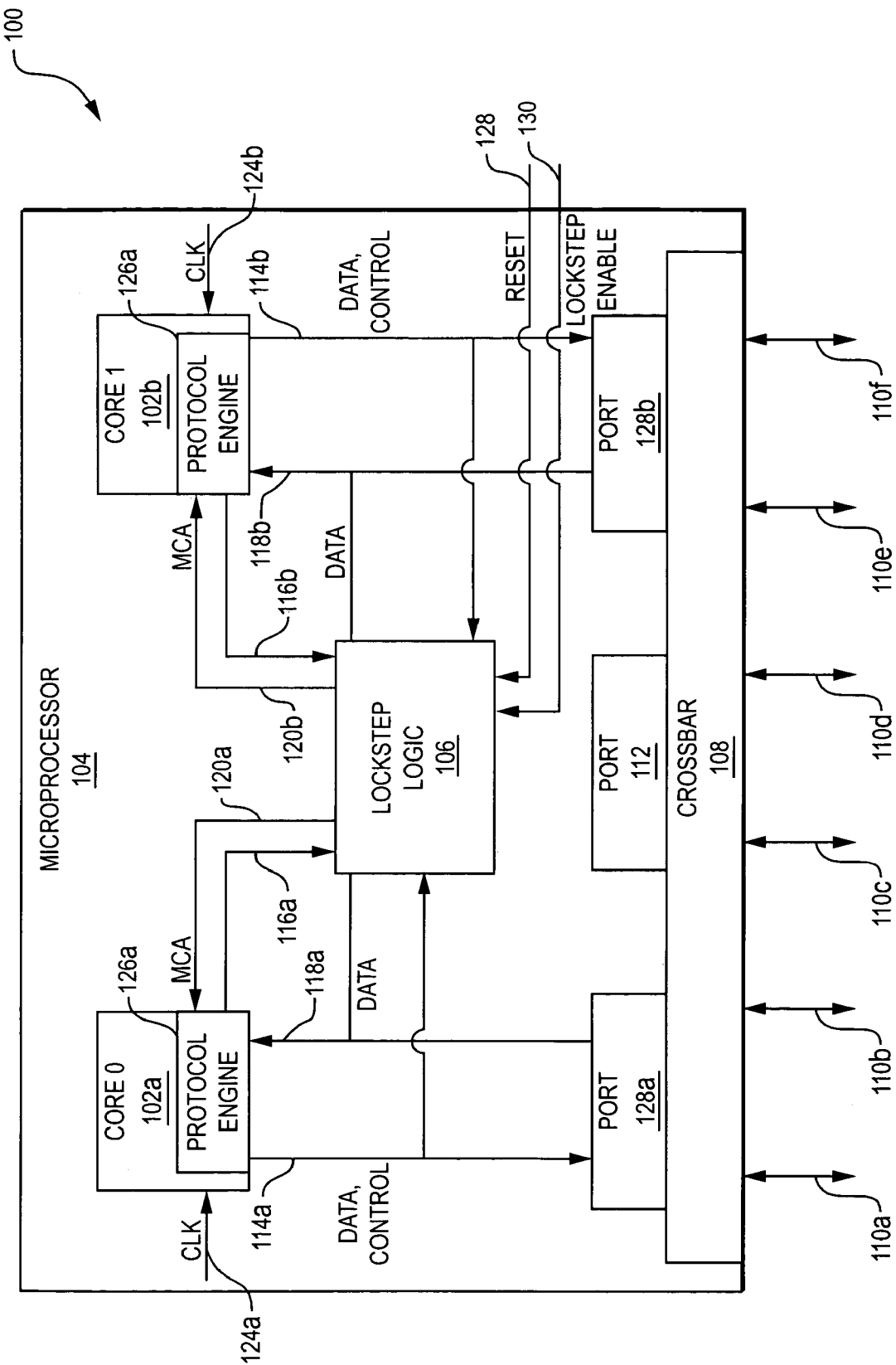
FIG. 1A is a block diagram of a system for operating multiple microprocessor cores in lockstep according to one embodiment of the present invention.

Referring to FIG. 1A, a block diagram is shown of a system 100 for operating multiple microprocessor cores 102a-b in lockstep according to one embodiment of the present invention. The cores 102a-b are components of a microprocessor 104, which may have additional cores (not shown in FIG. 1A for ease of illustration).

Cores 102a-b are coupled to ports 126a-b, respectively, of an on-chip crossbar 108. More specifically, core 102a outputs data/control signals to port 126a on line 114a and receives data signals from port 126a on line 118a. Similarly, core 102b outputs data/control signals to port 126b on line 114b and receives data signals from port 126b on line 118b.

The system 100 also includes lockstep logic 106, which is coupled to crossbar port 112. Lockstep logic 106 is coupled to data/control lines 114a-b and data lines 118a-b of cores 102a-b, through which the lockstep logic 106 may send and receive signals to and from the cores 102a-b.

Figure 1B:
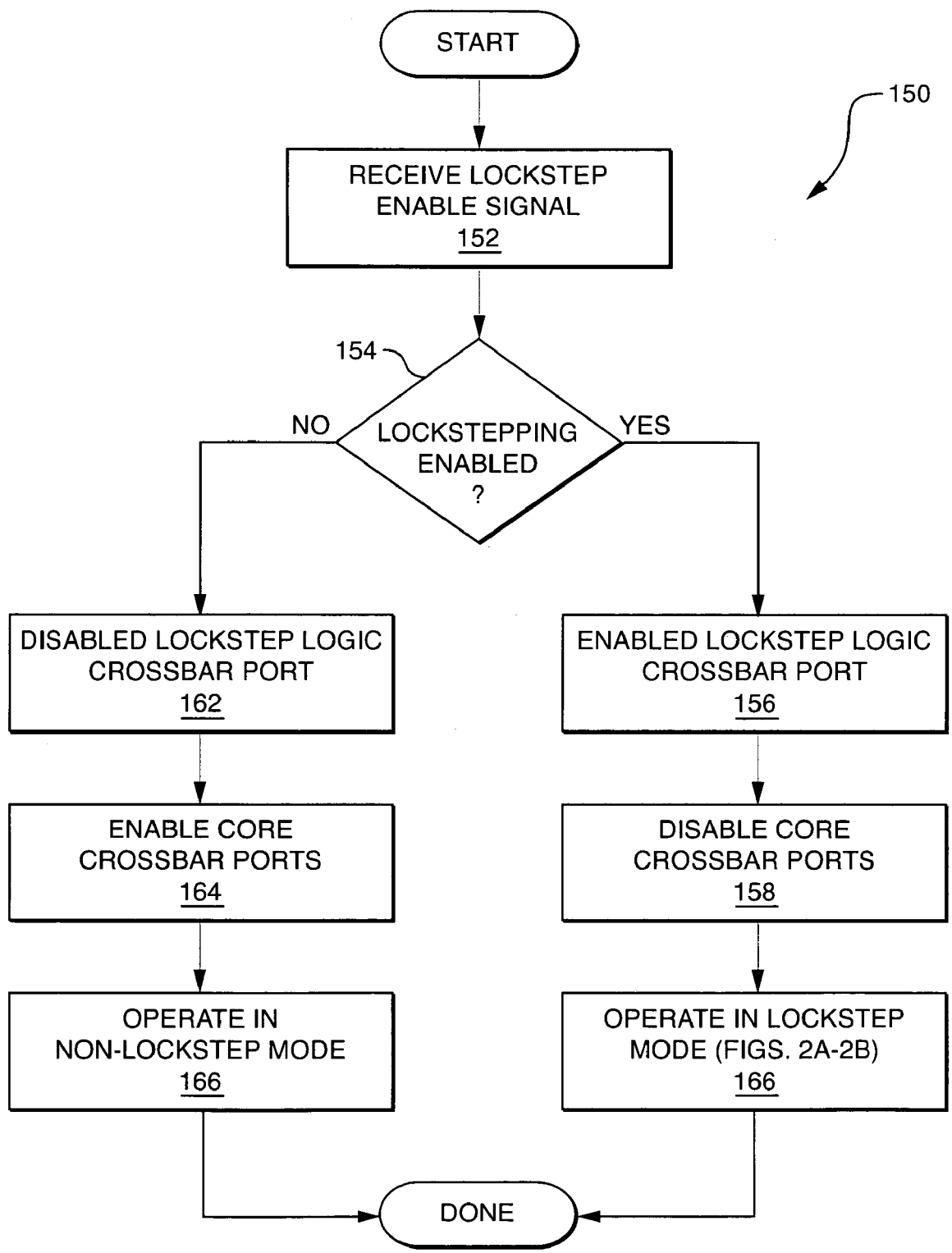
FIG. 1B is a flowchart of a method that is performed by the system of FIG. 1A to operate in either lockstep mode or non-lockstep mode according to one embodiment of the present invention.

The system 100 may operate in either a lockstep mode or a non-lockstep mode. Referring to FIG. 1B, a flowchart is shown of a method 150 that is performed by the system 100 in one embodiment of the present invention to operate in either lockstep mode or non-lockstep mode. Lockstep logic 106 receives, on line 130, a lockstep enable signal which indicates whether the lockstep logic 106 is to operate in lockstep mode (step 152). The lockstep enable line 130 may be coupled to configuration management circuitry or to any other circuitry for controlling whether the lockstep logic 106 is to operate in lockstep mode.

If the lockstep enable signal indicates that the lockstep logic 106 is to operate in lockstep mode (step 154), the lockstep logic crossbar port 112 is enabled (step 156), the core crossbar ports 126a-b are disabled (step 158), and the lockstep logic 106 operates in lockstep mode (step 160). Techniques that may be used by the lockstep logic 106 to operate in lockstep mode will be described in more detail below with respect to FIGS. 2A-2C. The microprocessor 104 may include circuitry for enabling/disabling ports 112 and 126a-b using techniques that are well-known to those of ordinary skill in the art.

If the lockstep enable signal indicates that the lockstep logic 106 is to operate in non-lockstep mode (step 154), the lockstep logic crossbar port 112 is disabled (step 162), the core crossbar ports 126a-b are enabled (step 164), and the lockstep logic 106 operates in non-lockstep mode (step 166). When in non-lockstep mode, the lockstep logic 106 does not perform lockstep error checking on the outputs of the cores 102a-b, and the lockstep logic 106 does not transmit signals on lines 118a-b to the cores 102a-b, respectively. Therefore, when the lockstep logic 106 operates in non-lockstep mode (step 166), the cores 102a-b communicate independently through their respective crossbar ports 126a-b without intervention by the lockstep logic 106.

Figure 2A:
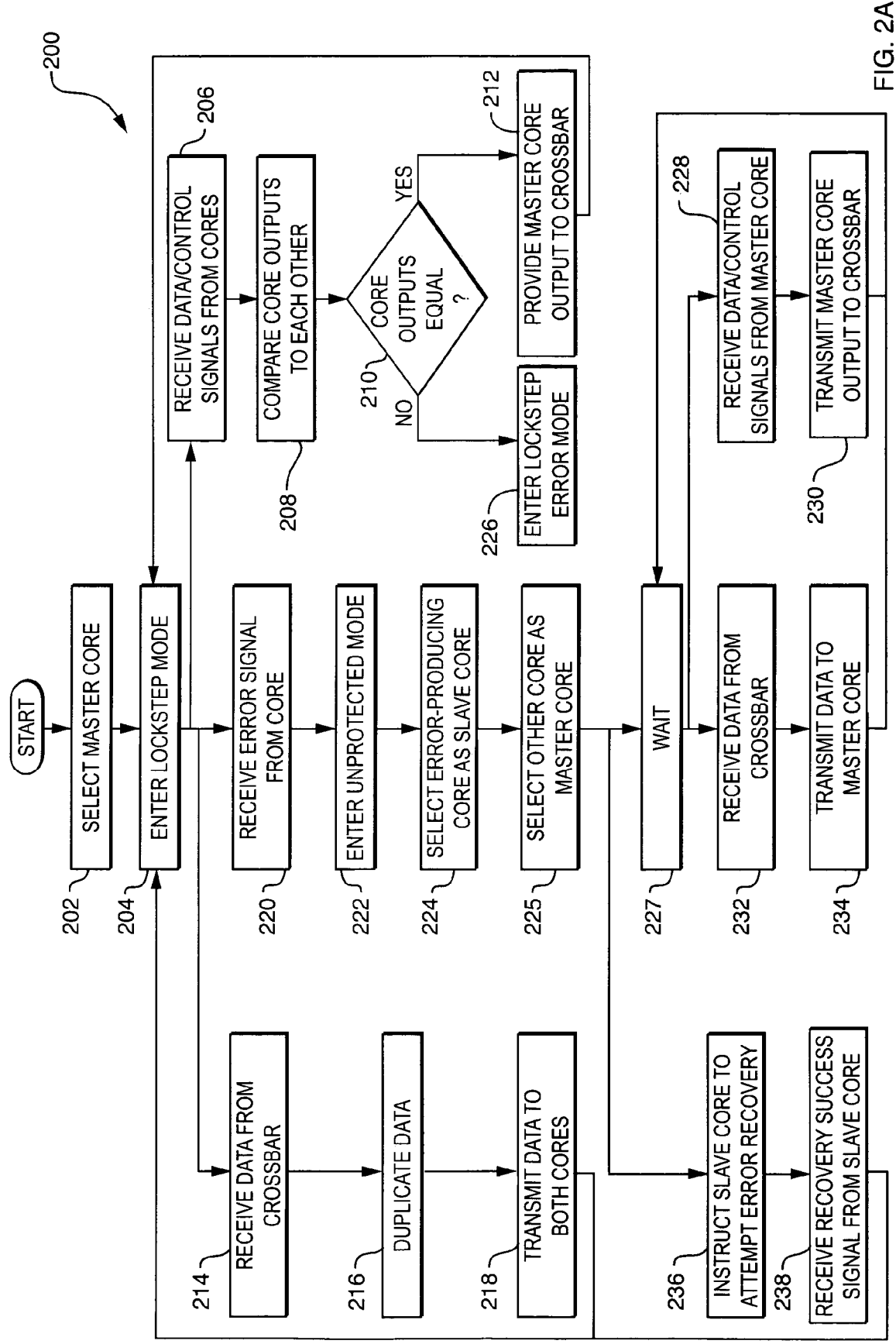
FIG. 2A is a flowchart of a method that is performed by the lockstep logic of FIG. 1A in one embodiment of the present invention.
Figure 2B:
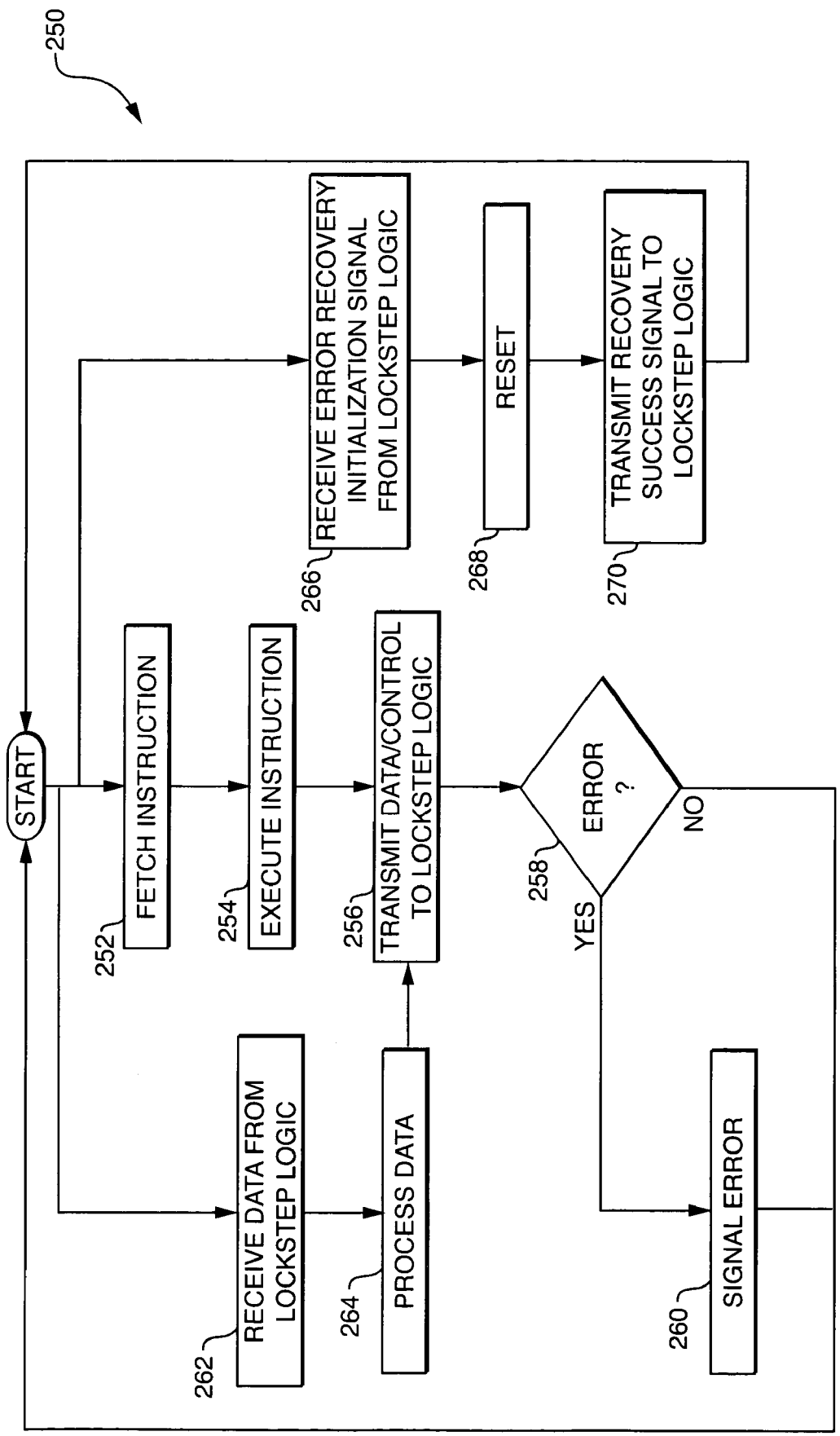
FIG. 2B is a flowchart of a method that is performed by lockstepped microprocessor cores in one embodiment of the present invention.

Referring to FIG. 2A, a flowchart is shown of a method 200 that is performed by the lockstep logic 106 in lockstep mode according to one embodiment of the present invention. Referring to FIG. 2B, a flowchart is shown of a method 250 that may be performed by either or both of the cores 102a-b in one embodiment of the present invention when the lockstep logic 106 is operating in lockstep mode. As mentioned above, the methods 200 and 250 may implement step 160 of method 150 (FIG. 1B).

The lockstep logic 106 selects one of the cores 102a-b as the "master core" and the other core as the "slave core" (step 202). Either of the cores 102a-b may be selected as the master or slave core. Alternatively, the selection of the master/slave may be done by external logic (such as fuses on the chip, or signals external to the chip.) The lockstep logic 106 enters lockstep mode (FIG. 2A, step 204). The next action taken by the lockstep logic 106 depends upon the input that the lockstep logic 106 next receives.

For example, referring to FIG. 2B, each of the cores 102a-b fetches the next instruction in the core's instruction stream (step 252), executes the instruction (step 254), and transmits any resulting data and/or control signals to the lockstep logic 106 (step 256). Referring to FIG. 2A, when the lockstep logic 106 receives such data/control signals on lines 114a-b (step 206), the lockstep logic 106 compares such outputs to each other (step 208). If the outputs of both cores 102a-b are the same (step 210), lockstep logic 106 provides the output of the master core to the crossbar 108 at port 112 (step 212). The crossbar 108 in turn transmits the master core output over one of a plurality of links 110a-f to a target component, such as a memory controller or another processor core (not shown), using techniques that are well-known to those of ordinary skill in the art.

When a data stream is received at port 112 from one of the links 110*a-f* at port 112 while the lockstep logic 106 is in lockstep mode, the lockstep logic 106 receives the data stream from the port 112 (step 214), duplicates the data stream (step 216), and transmits both copies of the data stream to cores 102*a-b* over data lines 118*a-b* (step 218). Referring to FIG. 2B, cores 102*a-b* receive the data from the lockstep logic 106 (step 262) and process it (step 264). When the lockstep logic 106 is operating in lockstep mode, each of the cores 102*a-b* performs step 264 in lockstep with the other core.

Note that although in the example just described the lockstep logic 106 receives output produced by every instruction executed by the cores 102*a-b*, this is merely an example and does not constitute a limitation of the present invention. For example, because in the example illustrated in FIG. 1A the lockstep logic 106 only processes signals transmitted by the cores 102*a-b* on lines 114*a-b*, the lockstep logic 106 does not compare the outputs of any instructions which do not cause the cores 102*a-b* to generate signals on lines 114*a-b*. Certain instructions, such as those which can be executed by a core solely using data within the microprocessor 104 (such as data stored in registers or an on-chip cache), may not require the core to transmit any data and/or control signals on lines 114*a-b* for off-chip processing. Such instructions, therefore, may be executed without generating any signals to be compared by the lockstep logic 106. If the cores 102*a-b*, however, are unable to complete execution of an instruction without off-chip data (such as data stored in an off-chip cache), the cores 102*a-b* may transmit messages on lines 114*a-b* (typically containing load or store instructions) which are compared by the lockstep logic 106.

It should be appreciated that devices which communicate with cores 102*a-b* through port 112 need only send and receive a single data stream through port 112, in the same manner as if communicating with a single processor or processor core, because the lockstep logic 106 transparently transmits data to and from the cores 102*a-b* as necessary. Using the techniques just described, therefore, the lockstep logic 106 performs lockstep checking on the cores 102*a-b* while providing the appearance of a single device coupled to port 112.

If a soft error or other error occurs in one of the cores 102*a-b*, the outputs of the cores 102*a-b* (on lines 114*a-b*) may differ from each other. If the lockstep logic 106 determines that the core outputs on lines 114*a-b* differ from each other (in step 210), the lockstep logic 106 exits lockstep mode and enters a mode that will be referred to herein as "lockstep error mode" (step 226). The operation of the lockstep logic 106 while in lockstep error mode will be described in more detail below with respect to FIG. 2C.

In one embodiment of the present invention, each of the cores 102*a-b* includes its own error-checking circuitry which checks for the occurrence of soft errors and/or other errors within the respective one of the cores 102*a-b*. Examples of such error-checking circuitry are well-known to those of ordinary skill in the art.

When the error-checking circuitry in one of the cores 102*a-b* detects an internal error, the core may transmit an error signal on the corresponding one of machine check architecture (MCA) lines 116*a-b* (FIG. 2B, step 260). In response to receipt of such an error signal (FIG. 2A, step 220), the lockstep logic 106 enters a mode that will be referred to herein as "unprotected mode" (step 222). In brief, when in unprotected mode the lockstep logic 106 stops performing lockstep checking, ignores the output produced by the core which signaled the error, and allows the other core to communicate bidirectionally with the crossbar port 112. The lockstep logic 106 attempts to clear the error and bring the error-producing core back into a normal mode of operation. If successful, the lockstep logic 106 returns to lockstep mode.

More specifically, when in unprotected mode the lockstep logic 106 selects the core that signaled the error as the slave core. (step 224) and selects the other core as the master core (step 225).

In one embodiment of the present invention, when the lockstep logic 106 is in unprotected mode, the lockstep logic 106 does not perform lockstep error checking on the outputs of the cores 102*a-b* (on lines 114*a-b*). Rather, the lockstep logic 106 enters a wait state 227 in which it awaits data from the crossbar port 112 or the master core. The lockstep logic 106 transmits all output of the master core to the crossbar port 112 (steps 228-230) and transmits all input received at the crossbar port 112 to the master core and not to the slave core (steps 232-234).

When in unprotected mode, the lockstep logic 106 transmits an "initiate recovery" signal to the slave core on the corresponding one of the MCA lines 120*a-b* (step 236). In response to receipt of the "initiate recovery" signal (FIG. 2B, step 266), the slave core attempts to recover from the error it has experienced, such as by attempting to reset itself (step 268). In the example illustrated in FIGS. 2A-2B, it is assumed that the slave core recovers successfully and transmits a "recovery success" signal to the lockstep logic 106 on the corresponding one of the MCA lines 116*a-b* (FIG. 2B, step 270). In response to receiving the "recovery success" signal from the slave core (FIG. 2A, step 238), the lockstep logic. 106 re-enters lockstep mode (step 204). Note that steps 236-238 may be performed concurrently with steps 227-234, and that exiting unprotected mode causes the loop in steps 227-234 to be terminated.

Although in the example illustrated in FIGS. 2A-2B, the lockstep logic 106 attempts to reset only the core from which an error signal has been received, the lockstep logic 106 may alternatively attempt to reset both cores 102*a-b* when an error signal is received from one of the cores. Furthermore, the lockstep logic 106 may reset itself 106 when an error signal has been received from one of the cores, in a further attempt to return to a mode of operation in which both cores 102*a-b* execute instructions in lockstep.

Figure 2C:
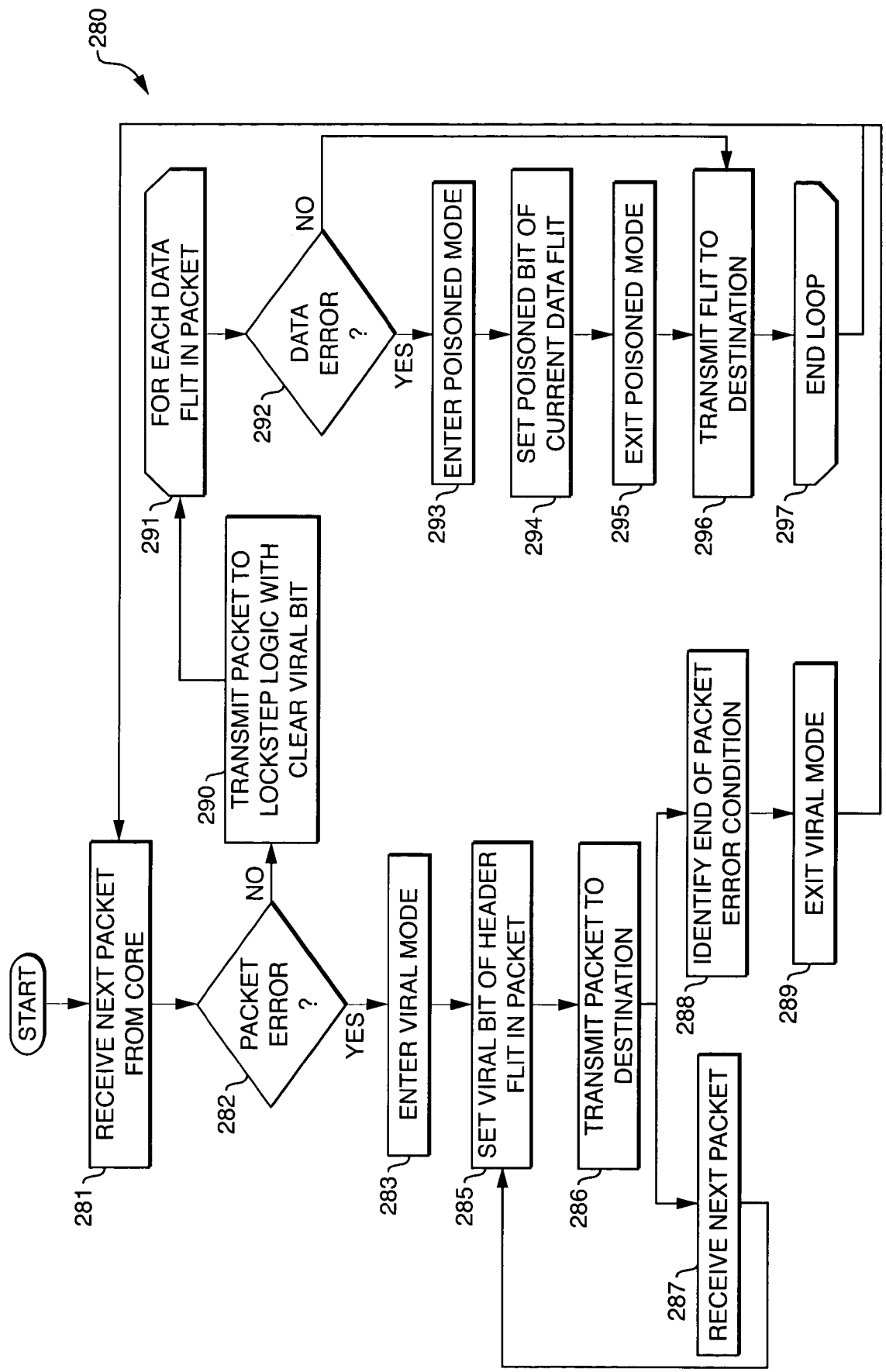
FIG. 2C is a flowchart of a method that is performed by the protocol engines of FIG. 1A to signal conventional packet errors and data errors according to one embodiment of the present invention.

Referring to FIG. 2C, a flowchart is shown of a method 280 that is performed by the lockstep logic 106 in response to detection of a lockstep error (FIG. 2A, step 226) according to one embodiment of the present invention. It can be difficult to recover from a lockstep error because typically it is not possible to determine which one of the cores 102*a-b* was responsible for the lockstep mismatch. A variety of techniques for attempting to recover from such an error, however, are well-known to those of ordinary skill in the art, such as attempting to return to some previous checkpoint and resetting both cores 102*a-b* and the lockstep logic 106. The lockstep logic 106 may attempt to perform such a recovery (step 282). If the recovery attempt is successful (step 284), the lockstep logic 106 re-enters lockstep mode (FIG. 2A, step 204). If the recovery attempt is unsuccessful, the lockstep logic 106 signals a fatal system error (step 288). Such an error typically requires the entire microprocessor 104 or the entire computer system 100 to be reset. Alternatively, the lockstep logic 106 may simply signal a fatal system error upon entering lockstep error mode, without attempting recovery.

Cores 102*a-b* also include protocol engines 126*a-b*, respectively. Before transmitting requests (such as memory load or store requests) to the crossbar 108 (through the lockstep logic 106), the protocol engines 126*a-b* convert such requests into packets defined according to a protocol that is compatible with the crossbar 108 and the links 110*a-f*. A single request may include a plurality of packets. When the lockstep logic 106 is in lockstep mode, the lockstep logic 106 compares the contents of each packet output by the cores 102*a-b* to verify that they are equal to each other.

More specifically, a single packet may include a plurality of "flits." In one embodiment of the present invention, for example, a packet includes a header flit containing one or more bits of data, followed by one or more data flits, also containing one or more bits of data. When the lockstep logic 106 is in lockstep mode, the lockstep logic 106 may compare each corresponding pair of flits generated by the cores 102*a-b* to verify that they are equal to each other. In other words, the comparison performed by the lockstep logic 106 in step 208 (FIG. 2A) may be a comparison between a pair of corresponding flits output by the cores 102*a-b*.

In one embodiment of the present invention, two different kinds of lockstep error notification (signaling) are supported. Before describing such lockstep error signaling, however, techniques that may be used by the protocol engines 126*a-b* to signal conventional errors will be described. Referring to FIG. 2C, a flowchart is shown of a method 280 that may be performed by each of the protocol engines 126*a-b* to signal conventional errors in packets received from the cores 102*a-b*. The protocol engines 126*a-b* await incoming packets from the cores 102*a-b*, respectively. Although the protocol engines 126*a-b* also process packets received from the crossbar port 112, such packets may be processed using conventional techniques which therefore are not described herein.

One kind of error that may occur in a packet is referred to herein as a "packet error," which refers to an error in which an entire packet is corrupted or otherwise unusable. One example of such an error is an uncorrectable error in the routing table, which is used to identify the destination of a packet. When one of the protocol engines 126*a-b* receives a packet from one of the cores 102*a-b* (step 281), the protocol engine determines whether a packet error is associated with the packet (step 282). If there is such an error, the protocol engine enters a mode of operation referred to as "viral mode" (step 283). Although a protocol engine may enter viral mode in response to directly identifying the existence of a packet error, a protocol engine may also enter viral mode in response to receiving a packet which has already been flagged by another protocol engine as being associated with a packet error. As will be described in more detail below, by flagging packets in this way before retransmitting them, protocol engines 126*a-b* may signal the existence of packet errors to other protocol engines.

Each header flit includes a "viral" bit which indicates the existence of a packet error. When in viral mode, the protocol engine sets the viral bit of the current packet (step 285), transmits the packet to its destination (through the lockstep logic 106) (step 286), and continues to set the viral bit of the header flits in subsequent packets until the protocol engine determines that the condition which originally caused the packet error condition no longer exists (steps 285-289).

Upon exiting viral mode, the protocol engine continues to receive additional packets and process them normally (step 281). Note that if there is no packet error associated with a packet, the protocol engine transmits the packet to the lockstep logic 106 with a clear viral bit (step 290). Techniques for identifying the presence or absence of packet errors are well-known to those of ordinary skill in the art. Components which receive "viral" packets may, for example, discard such packets or take other appropriate action.

The second kind of error that may occur in a packet is referred to herein as a "data error," which refers to an error in a particular packet, such as the corruption of data in the packet, which is limited to that packet and which does not affect the validity of subsequent packets. Each data flit in a packet includes a "poisoned" bit which indicates whether a data error has been detected in the data flit. Components which receive packets containing data errors may simply discard such packets.

The method 280 determines whether a data error is associated with each of the data flits in the current packet (steps 291-292). When a data error is detected in a particular data flit, the protocol engine enters "poisoned mode" (step 293). Note that a data error may be detected in any of the data flits within a packet, and that the protocol engine may therefore enter poisoned mode after receiving any data flit within a packet. When in poisoned mode, the protocol engine sets the poisoned bit of the current data flit (step 294), exits poisoned mode (step 295), and transmits the modified data flit to its destination (through the lockstep logic 106) (step 296). If no data error is detected in a data flit, the protocol engine simply transmits the data flit to the lockstep logic 106 without modifying the data flit's poisoned bit (step 296). Steps 292-296 are repeated for each data flit in the packet (step 297). Components which receive "poisoned" data flits may, for example, discard such flits or take other appropriate action.

Although in the embodiment illustrated in FIG. 2C, the protocol engine only sets the poisoned bit of a data flit if a data error is detected in that data flit, this is merely an example and does not constitute a limitation of the present invention. Alternatively, for example, once a data error has been detected in a data flit in a packet, the protocol engine may set the poisoned bit both of that data flit and of subsequent data flits in the same packet. As yet another alternative, upon detecting a data error in a data flit, the protocol engine may set the poisoned bits of all subsequent data flits in the current packet, and then enter viral mode and thereby set the viral bits of subsequent packets.

Figure 3:
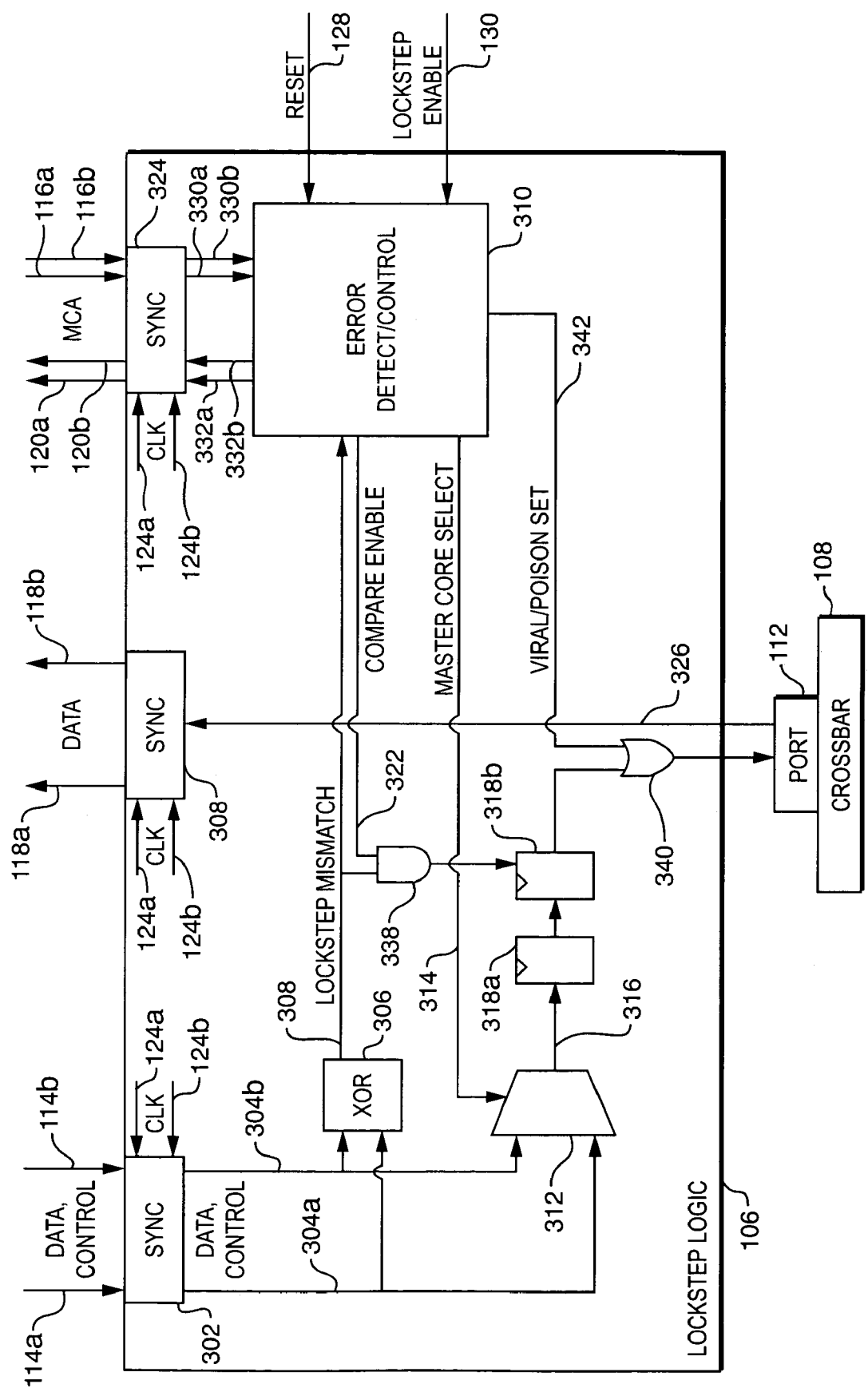
FIG. 3 is a block diagram illustrating the lockstep logic of FIG. 1 according to one embodiment of the present invention.

Referring to FIG. 3, the lockstep logic 106 is illustrated in more detail according to one embodiment of the present invention. As described above, lockstep logic 106 receives data/control signals from cores 102*a-b* on lines 114*a-b*, respectively (FIG. 2A, step 206). The signals on lines 114*a-b* may be slightly out of sync with each other due to differences between clock signals provided to cores 102*a-b* on clock lines 124*a-b*, respectively. Lockstep logic 106 therefore includes a synchronizer 302, which receives as inputs both the data/control outputs of cores 102*a-b* on lines 114*a-b* and the core clock signals on lines 124*a-b*. Synchronizer 302 produces synchronized data/control signals on lines 304*a-b* using techniques that are well-known to those of ordinary skill in the art.

Lockstep logic 106 also includes an exclusive OR (XOR) gate 306, which receives as inputs the synchronized data/control signals (on lines 304*a-b*) and performs a logical XOR operation on them to produce a "lockstep mismatch" signal on line 308 (FIG. 2A, steps 208-210). The lockstep mismatch signal is asserted only when the synchronized data/control signals on line 304*a-b* are unequal to each other, thereby indicating that a soft error or other error has occurred in one of the cores 102*a-b*.

Note that the synchronized data/control signals on lines 304*a-b* are provided as data inputs to a multiplexer 312. The output 316 of multiplexer 312 is coupled to the crossbar port 112 through staging registers 318*a-b*. A "master core select" signal is provided on line 314 to the selection input of the multiplexer 312, thereby selecting the data/control signal on one of lines 304*a-b* for output to the crossbar port 112.

In one embodiment of the present invention, the master core select signal is generated by an error detection and control engine 310. The error detection and control engine 310 may, for example, be implemented as a finite state machine in a ROM or other circuitry. The error detection and control engine 310 receives as inputs: (1) the lockstep mismatch signal on line 308; and (2) MCA signals on lines 330*a-b*. The MCA signals on lines 330*a-b* are synchronized versions of the MCA signals on lines 116*a-b* and are produced by a synchronizer 324 which is clocked by the core clock signals on lines 124*a-b*.

Engine 310 may detect when an error has occurred in cores 102*a-b* by reference to the MCA signals on lines 330*a-b*. When the error detection and control engine 310 detects such an error, the engine 310 enters unprotected mode, as described above (FIG. 2A, step 222). The engine 310 outputs a selection signal on line 314 which selects the data/control signal output by the master core as the output of the multiplexer 312. The multiplexer 312 thereby transmits the data/control signal output by the master core to the crossbar port 112 through staging registers 318*a-b* (FIG. 2A, step 212).

The engine 310 asserts a "compare enable" signal on line 322 when the engine 310 is in lockstep mode. Both the compare enable signal and the lockstep mismatch signal on line 308 are provided as inputs to an AND gate 338. The output of AND gate 338 is high, therefore, when the engine 310 is in lockstep mode and a lockstep error has occurred. The output of the AND gate 338 is provided as an input to a reset input of the second staging register 318*b*, thereby inhibiting the output of the staging register 318*b* when a lockstep error has occurred. This prevents the output of either of the cores 102*a-b* from being transmitted to crossbar port 112 when a lockstep error has occurred.

The purpose of staging registers 318*a-b* is to provide a delay before the output of the multiplexer 312 is provided to the crossbar port 112. Such a delay provides time for the inhibit signal (output by the AND gate 338) to be produced and thereby to prevent the output of the multiplexer 312 from being transmitted to the crossbar port 112 in the event that a lockstep error has occurred. Staging registers 318*a-b* may alternatively be implemented using a conventional first-in, first-out (FIFO)-type queue, or any other mechanism for introducing an appropriate delay.

When in unprotected mode (FIG. 2A, step 222), the engine 310 de-asserts the compare enable signal on line 322 and transmits a recovery initiation signal to the slave core on the corresponding one of MCA lines 120*a-b* (FIG. 2A, step 236). Note that the engine 310 produces MCA signals on lines 332*a-b*, and that synchronizer 324 synchronizes these signals to produce MCA signals on lines 120*a-b*. If the engine 310 subsequently receives a recovery success signal from the slave core on corresponding one of lines 120*a-b* (FIG. 2A, step 238), the engine 310 may re-enter lockstep mode (FIG. 2A, step 204), as described above, and re-assert the compare enable signal on line 322.

When the lockstep logic 106 receives data from the port 112 (FIG. 2A, step 214), the data are transmitted on line 326 to a synchronizer 328, which receives the core clock signals on lines 124*a-b*, and produces signals on lines 304*a-b*, respectively, which are synchronized with the clock signal (not shown) of the lockstep logic 106 itself. Synchronizer 328 duplicates the data stream on line 326 (step 216) and provides the duplicated and synchronized data stream to cores 102*a-b* on data lines 118*a-b*, respectively (step 218). Note that in the embodiment illustrated in FIG. 3, the data received from crossbar port 112 is provided to both cores 102*a-b*, whether the lockstep logic 106 is operating in lockstep mode or in unprotected mode. Alternatively, the lockstep logic 106 may be configured to provide the data on line 326 only to the master core when the lockstep logic is operating in unprotected mode (FIG. 2A, steps 232-234).

Figure 4A:
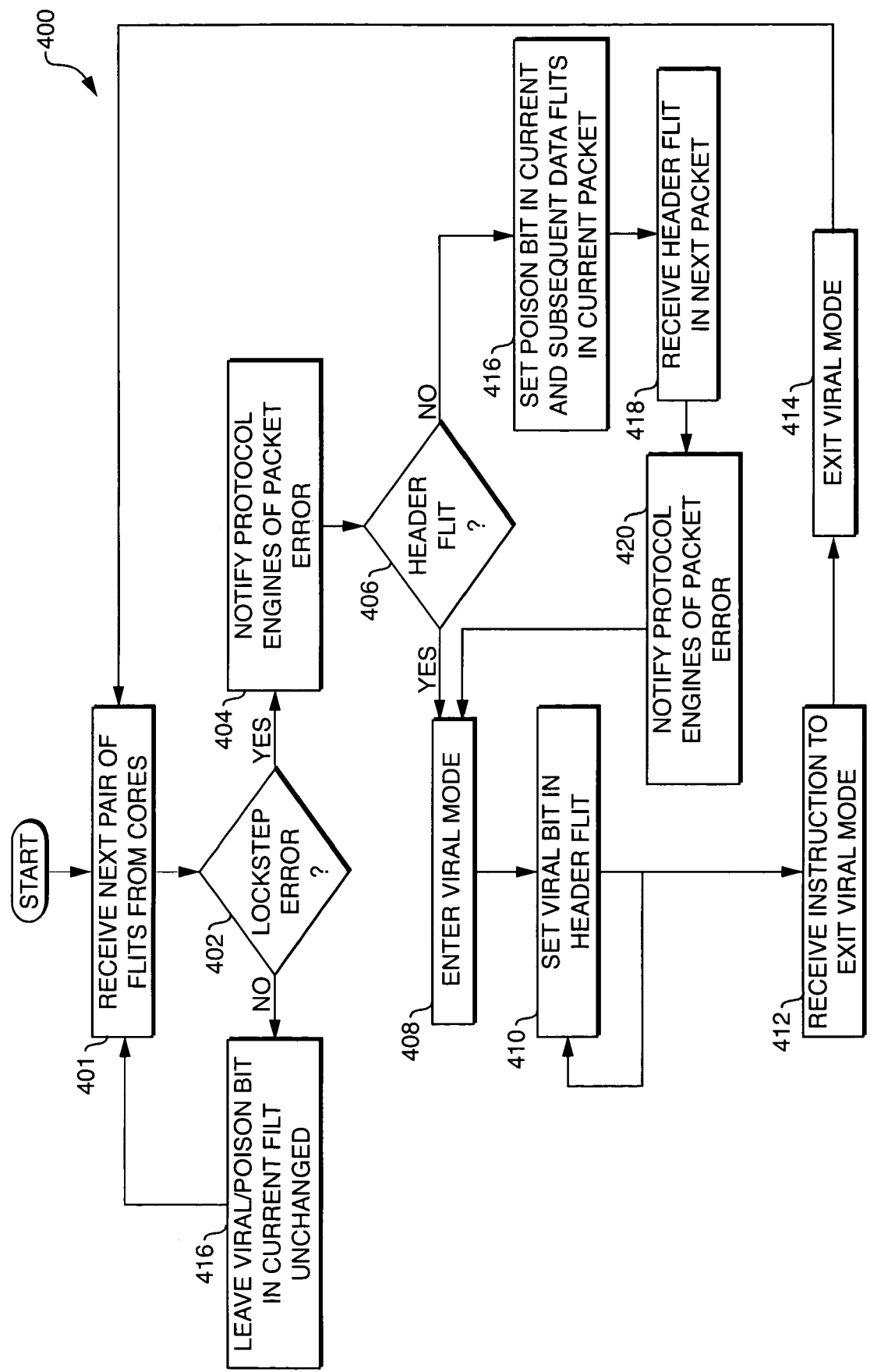
FIG. 4A is a flowchart of a method that is performed by the error detection and control engine of FIG. 3 to signal lockstep errors according to a first embodiment of the present invention.

Referring to FIG. 4A, a flowchart is shown of a method 400 that is performed by the error detection and control engine 310 in one embodiment of the present invention to detect and signal lockstep errors in packets transmitted by the cores 102*a-b*. The engine 310 may signal such errors in conjunction with the protocol engines. 126*a-b*, as will be described in more detail below with respect to FIG. 6.

The lockstep logic 106 receives the next pair of flits from the cores 102*a-b* (step 401). The XOR block 306 compares the pair of flits to each other. If the XOR block 306 detects a mismatch between the two flits, the XOR block 306 asserts the lockstep mismatch signal on line 308. The error detection and control engine 310 receives the lockstep mismatch signal on line 308 and determines whether a lockstep error has occurred based on the value of the lockstep mismatch signal (step 402). If there is no lockstep mismatch (i.e., if the two flits are equal), the lockstep logic 106 leaves the viral/poisoned bit of the flits unchanged and forwards one of the flits to the crossbar port 112 in the manner described above (step 416).

If there is a lockstep error, the engine 310 signals the error by modifying the flit that is being transmitted to crossbar port 112. The kind of error signaling depends on the type of flit for which a lockstep mismatch was detected. For example, in the embodiment illustrated in FIG. 3, staging register 318*b* is coupled to crossbar port 112 through one input of an OR gate 340. To set the viral or poison bit in a flit, the error detection and control engine 310 transmits an appropriate signal on line 342, which is coupled to the other input of the OR gate 340. The OR gate 340 thereby sets the viral/poisoned bit of the output of the staging register 318*b* and transmits the resulting signal to the crossbar port 112.

Since the output of the staging register 318*b* may be many bits wide, the OR gate 340 may be the same width as the output of the staging-register 318*b*, and the error detection and control engine 310 may output a signal on line 342 having the same width as the output of the staging register 318*b*, with the bit at the position of the viral/poison bit being set and the remaining bits being cleared. Alternatively, the single viral/poison bit of the staging register 318*b* may be provided as input to the OR gate 340, with the remaining bits being passed straight through (with an appropriate delay) to the crossbar port 112. The error detection and control engine 310 may then transmit a single-bit viral/poison signal on line 342. Alternatively, the error detection and control engine 310 may transmit separate viral and poison signals on separate lines (not shown) to separate OR gates (not shown). These and other techniques for enabling the viral/poison bit of the output of the staging register 318*b* to be modified will be apparent to those having ordinary skill in the art.

Before signaling the lockstep error, the engine 310 notifies the protocol engines 126a-b of a packet error (step 404), thereby causing the protocol engines 126a-b to enter viral mode. In general, as a result of step 404, the protocol engines 126a-b will begin to set the viral bits of subsequent packets they receive. Note that even though a packet error typically is associated only with certain kinds of errors which invalidate an entire packet, in the embodiment illustrated in FIG. 4A the protocol engines 126a-b are notified of a packet error regardless of the cause of the lockstep error identified in step 402. Operation of the protocol engines 126a-b in viral mode in response to step 404 will be described in more detail below with respect to FIG. 6.

The engine 310 determines whether the current flit is a header flit (step 406). As is well-known to those having ordinary skill in the art, the engine 310 may identify the type of the current flit (e.g., header or data) by examining the contents of the current flit. If the current flit is a header flit, the engine 310 enters viral mode (step 408), in which the engine 310 sets the viral bit of each header flit it transmits to the crossbar port 112 (step 410).

As will be described in more detail below with respect to FIG. 6, after the protocol engines 126a-b enter viral mode in response to step 404, one or both of the protocol engines 126a-b instructs the lockstep logic 106 to exit viral mode. When the lockstep logic 106 receives this instruction (FIG. 4A, step 412), it exits viral mode (step 414), and returns to processing incoming packets normally (i.e., without setting their viral bits), until the next lockstep error is identified. Note that the lockstep logic 106 may not exit viral mode until after all inflight packets between the protocol engines 126a-b and the staging registers 318a-b have been made viral.

Figure 6:
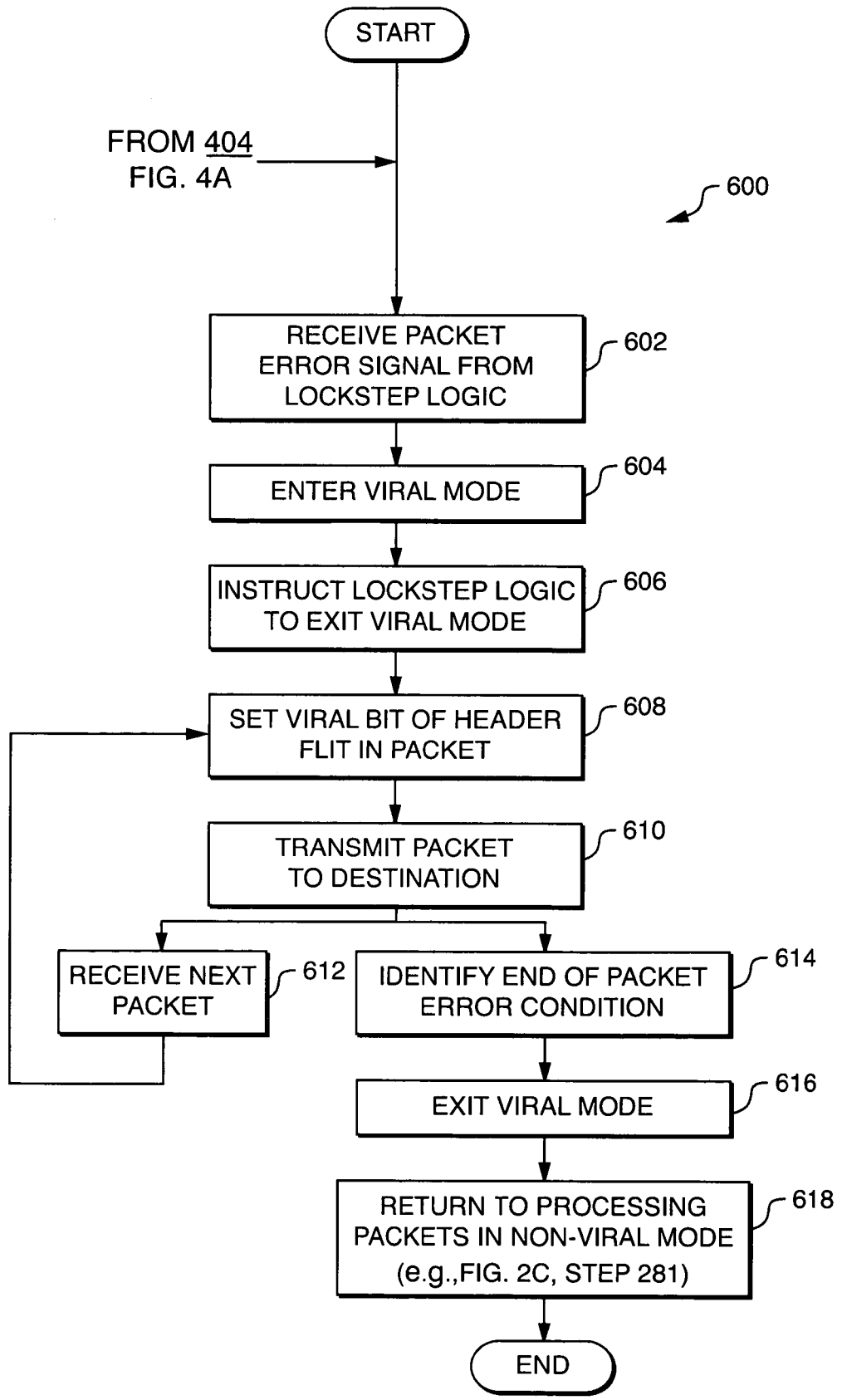
FIG. 6 is a flowchart of a method that is performed by the protocol engines of FIG. 1A to signal lockstep errors according to one embodiment of the present invention.

Referring to FIG. 6, a flowchart is shown of a method 600 that is performed by the protocol engines 126a-b according to one embodiment of the present invention in response to being notified by the lockstep logic 106 of a packet error (FIG. 4A, step 404). Although the method 600 will be described as being performed by one of the protocol engines 126a-b, the method 600 may be performed by either or both of the protocol engines 126a-b.

The protocol engine receives the packet error signal from the lockstep logic 106 (step 602). In response, the protocol engines enters viral mode (step 604). The protocol engine instructs the lockstep logic 106 to exit viral mode (step 606). In response, the lockstep logic 106 exits viral mode at some point after receiving the instruction from the protocol engine (FIG. 4A, step 412).

The protocol engine sets the viral bit of the header flit in the current packet (step 608), transmits the packet to its destination (step 610), and continues to do so until the end of the packet error condition is identified (steps 608-614). The protocol engine exits viral mode (step 616) and returns to processing packets in non-viral mode (step 618). Note that steps 604-616 of method 600 may be performed in the same manner as steps 283-289 of FIG. 2C, with the addition of step 606.

Note that in the above-described embodiment, both the protocol engines 126a-b and the error control and detection engine 310 may operate in lockstep mode at the same time for some period after the detection of the lockstep error in step 402. During such time, both the protocol engines 126a-b and the error control and detection engine 310 set the viral bit of each header flit. Although this results in the viral bit of each header flit being set twice, such activity is not harmful. Furthermore, additional steps may be taken to coordinate the timing of the protocol engines 126a-b and the lockstep logic 106 so that the viral bit of each header flit is set by either the protocol engines 126a-b or the lockstep logic 106, but not by both.

Returning to FIG. 4A, if the identified lockstep error has occurred in a data flit, the engine 310 sets the poisoned bit in the current data flit before the data flit is transmitted to the crossbar port 112 (step 416). Furthermore, the engine 310 sets the poisoned bits in the remaining data flits of the current packet before they are transmitted to the crossbar port 112 (step 414).

When the header flit of the next packet is received by the lockstep logic 106 (step 418), the engine 310 notifies the protocol engines 126a-b of a packet error (step 420) in the manner described above with respect to step 404, thereby causing the protocol engines 126a-b to enter viral mode and operate in the manner described above with respect to FIG. 6. As described above, the engine 310 itself enters viral mode (step 408) and sets the viral bit of the current header flit and of subsequent header flits (step 412) until the engine 310 receives an instruction from one of the protocol engines 126a-b to exit viral mode (step 412).

Figure 4B:
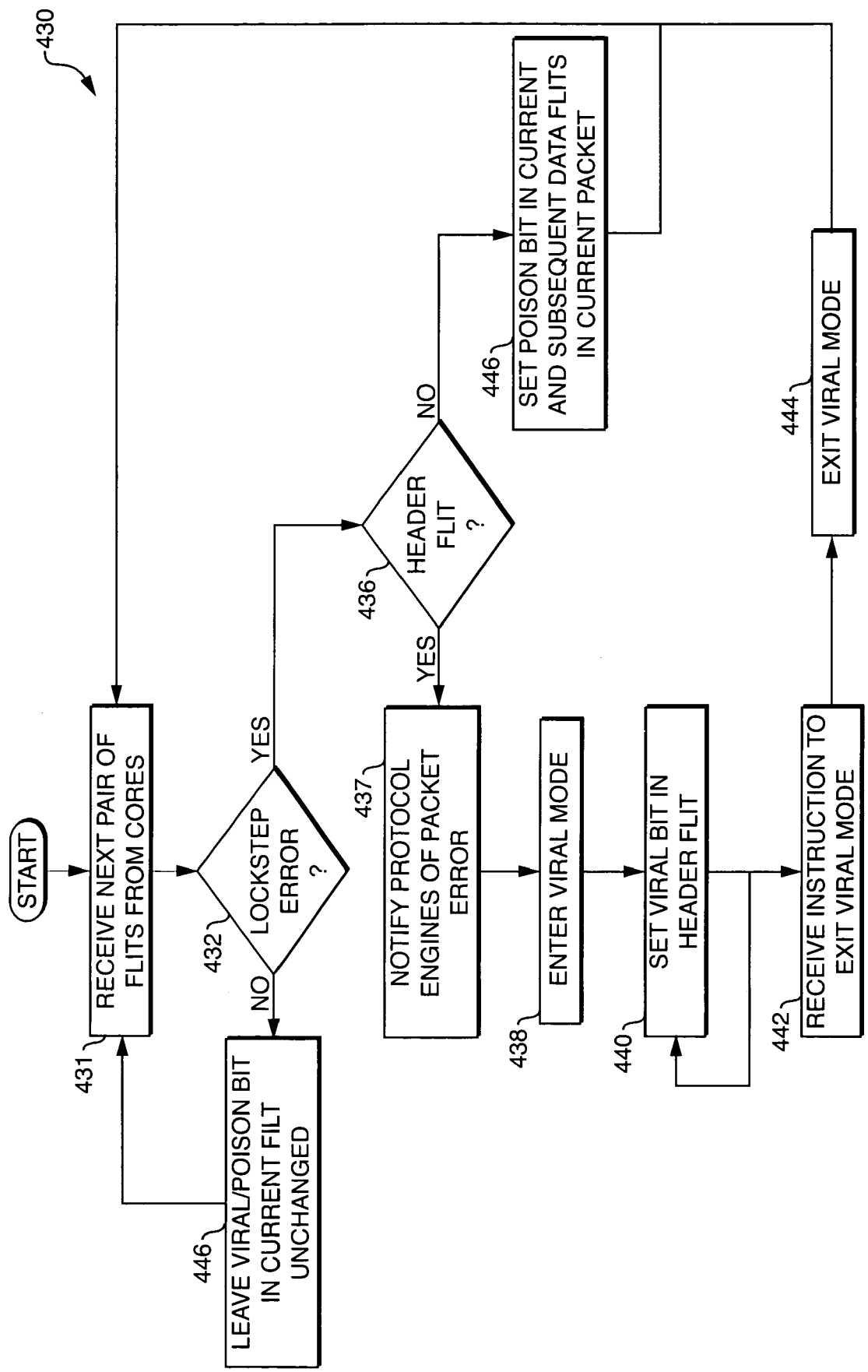
FIG. 4B is a flowchart of a method that is performed by the error detection and control engine of FIG. 3 to signal lockstep errors according to a second embodiment of the present invention.

Although in the embodiment illustrated in FIG. 4A, the detection of a lockstep error in a data flit causes the lockstep logic 106, in conjunction with the protocol engines 126a-b, to set the poisoned bits in all subsequent data flits in the same packet and to set the viral bits in header flits in subsequent packets, this is not a requirement of the present invention. Referring to FIG. 4B, for example, a flowchart is shown of a method 430 which is performed by the lockstep logic 106 to signal lockstep errors according to another embodiment of the present invention. In the embodiment illustrated in FIG. 4B, the detection of a lockstep error in a data flit causes the poisoned bits in that data flit and in subsequent data flits in the same packet to be set, but does not cause the viral bits of header flits in subsequent packets to be set.

In accordance with the method 430, the lockstep logic 106 receives the next pair of flits from the protocol engines (step 431) and determines whether there is a lockstep error (step 432) in the manner described above with respect to steps 401-402 of method 400 (FIG. 4A). If there is no lockstep error, the lockstep logic 106 leaves the viral/poison bit in the current flit unchanged (step 446).

If the lockstep logic 106 detects a lockstep error, the lockstep logic 106 determines whether the current flit is a header flit (step 436). If the current flit is a header flit, the lockstep logic notifies the protocol engines 126a-b of a packet error (step 437), in the manner described above with respect to step 404 (FIG. 4A). The lockstep logic 106 then enters viral mode and operates in steps 438-444 in the same manner as in steps 408-414 of FIG. 4A.

If there is a lockstep error and the current flit is a data flit, the lockstep logic 106 sets the poisoned bit in the current data flit and in subsequent data flits in the same packet (step 446), and then returns to step 431. Note that in the embodiment illustrated in FIG. 4B, the lockstep logic 106 does not enter viral mode or instruct the protocol engines 126a-b to enter viral mode if a lockstep error is detected in a data flit. Rather, the lockstep logic 106 only enters viral mode and instructs the protocol engines 126a-b if a lockstep error is detected in a header flit.

Figure 4C:
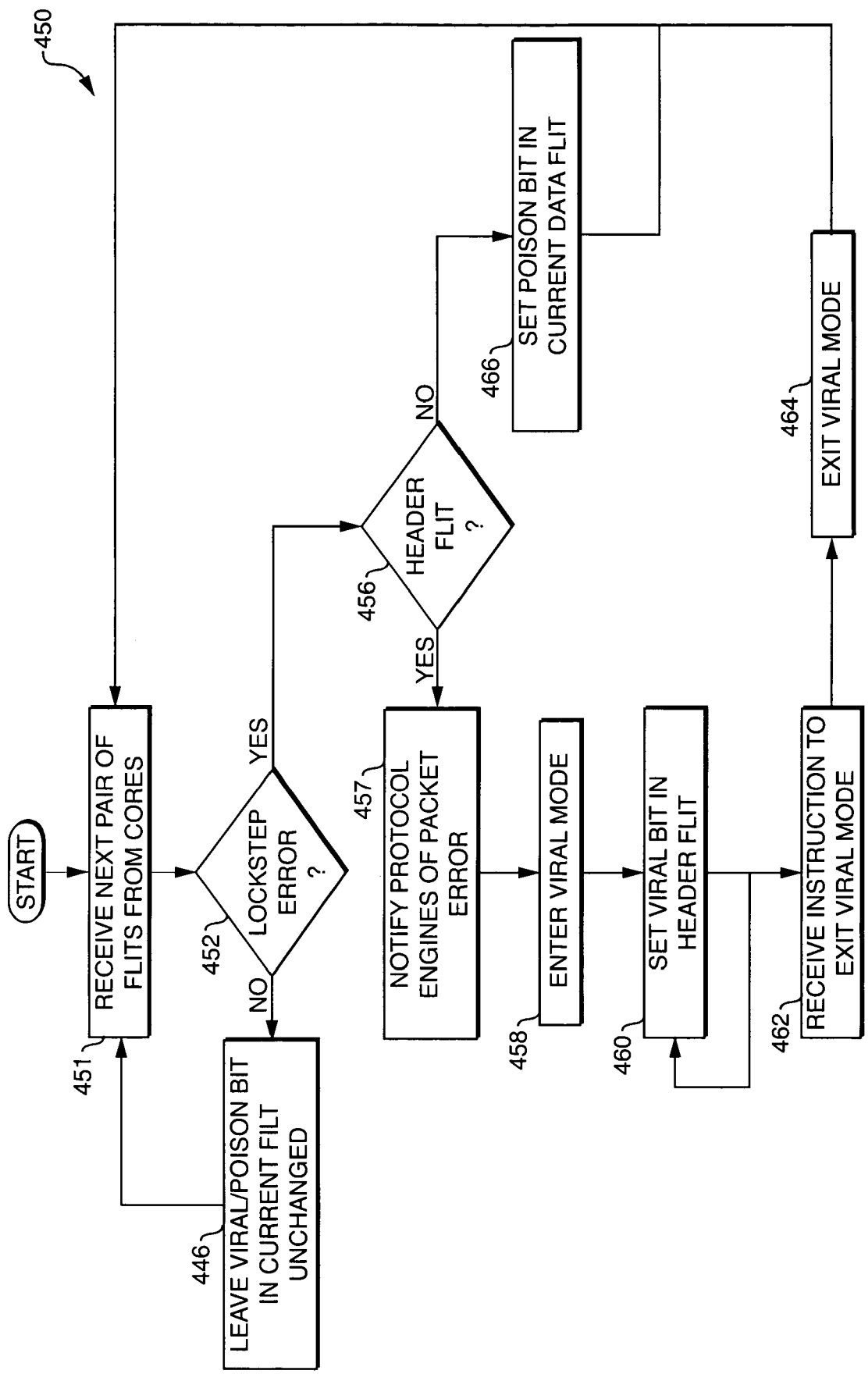
FIG. 4C is a flowchart of a method that is performed by the error detection and control engine of FIG. 3 to signal lockstep errors according to a third embodiment of the present invention.

Referring to FIG. 4C, a flowchart is shown of a method 450 which is performed by the lockstep logic 106 to signal lockstep errors according to yet another embodiment of the present invention. In the embodiment illustrated in FIG. 4C, the detection of a lockstep error in a data flit causes the poisoned bit in that data flit to be set, but does not cause the poisoned bits in subsequent data flits or the viral bits of header flits in subsequent packets to be set.

Steps 451-464 of the method 450 operate in the same manner as steps 431-444 of method 430 (FIG. 4B). When the lockstep logic 106 detects a lockstep error in a data flit, however, the lockstep logic 106 sets the poisoned bit in that data flit only (step 466), rather than automatically setting the poisoned bits of all subsequent data flits in the same packet, as in the method 430 in FIG. 4B. In other words, in the method 450 of FIG. 4C, the poisoned bits of data flits are set in response to the detection of lockstep errors on a flit-by-flit basis.

One advantage of the embodiment illustrated in FIG. 4C is that the occurrence of a data error in a particular data flit may not indicate that a lockstep error has occurred. As a result, setting the poisoned bit for only those individual data flits associated with data errors may enable the system to recover from such errors without attempting to reset the entire microprocessor 104 or one or both of the cores 102a-b. The techniques illustrated in FIG. 4C may, therefore, enable the system 100 to recover from data errors more quickly and reliably than techniques which require the entire microprocessor 104 or the cores 102a-b to be reset.

Figure 5:
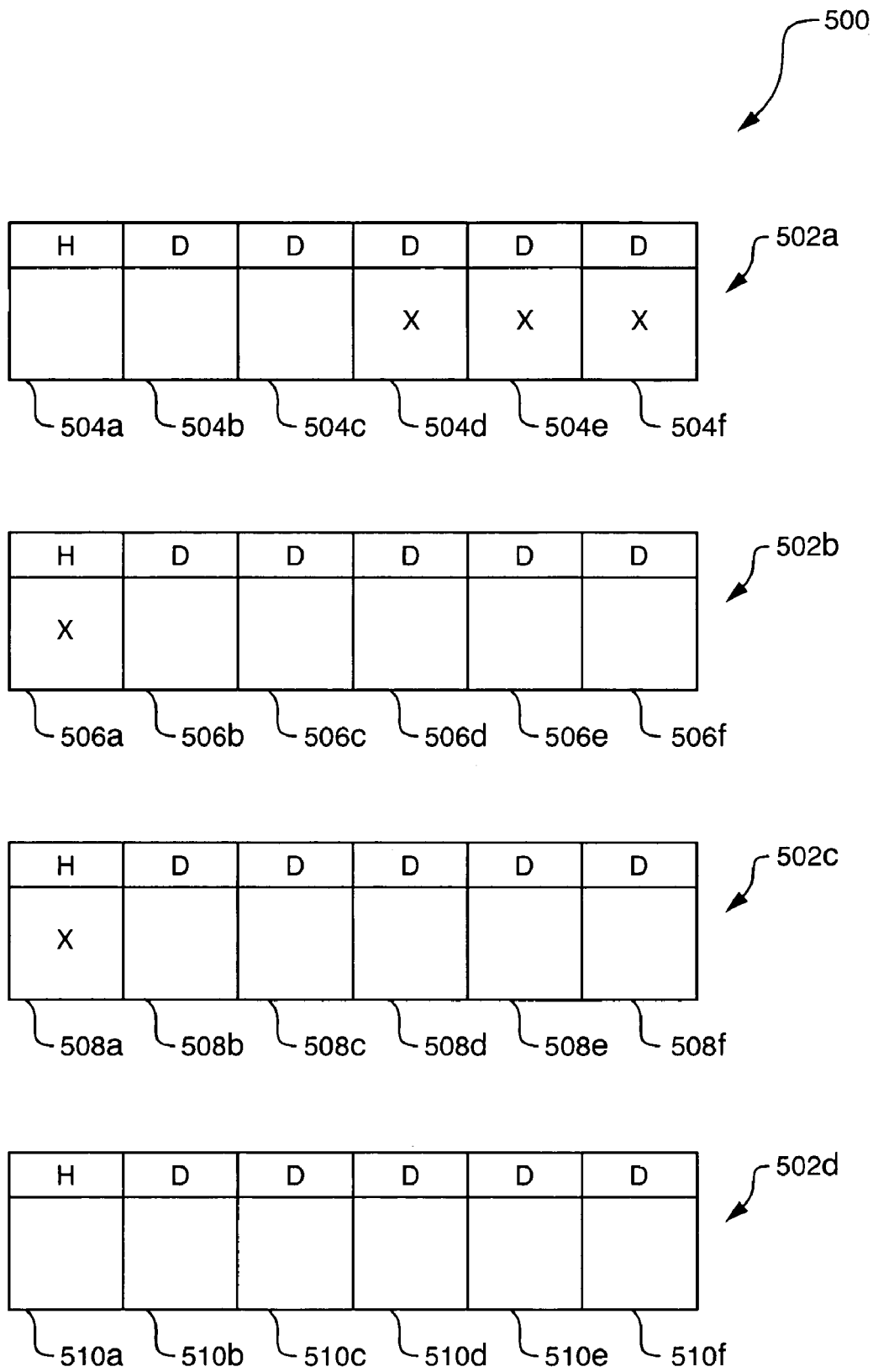
FIG. 5 is a diagram illustrating the state of viral and poisoned bits in a packet stream produced by the lockstep logic of FIG. 1 according to one embodiment of the present invention.

Referring to FIG. 5, a diagram is shown illustrating the state of viral and poisoned bits in a packet stream 500 produced by the lockstep logic 106 in one embodiment of the present invention according to the method 400 illustrated in FIG. 4A. For purposes of example, the packet stream 500 includes four packets 502a-d, each of which includes a single header flit and five data flits. The techniques described herein may, however, be applied to packet streams of any length, and to packets including any number of header and data flits, including packet streams with differing lengths of both header and data flits.

Each of the flits in FIG. 5 is represented by a letter indicating the flit type ("H" for header and "D" for data), below which appears a cell indicating the state of the corresponding viral or poisoned bit. Since header flits contain a viral bit but not a poisoned bit, and data flits contain a poisoned bit but not a viral bit, a single "viral/poisoned" bit position may be used in both header and data flits. In header flits the bit at this position may be interpreted as a viral bit, while in data flits the bit at this position may be interpreted as a poisoned bit. An "X" in the cell of a header flit indicates that the viral bit of the header flit is set, while an empty cell in a header flit indicates that the viral bit of the header flit is not set. Similarly, an "X" in the cell of a data flit indicates that the poisoned bit of the data flit is set, while an empty cell in a data flit indicates that the poisoned bit of the data flit is not set.

Packet 502a includes header flit 504a and data flits 504b-f. Assume for purposes of example that no error condition exists upon initiation of the transmission of packet 502a. Asia result, the viral bit of header flit 504c is clear, as are the poisoned bits of data flits 504b-c. Assume further that a data error is detected in data flit 504d. As a result, the error detection and control engine 310 sets the poisoned bit of data flit 304d and of the remaining data flits 504e-f in packet 502a before each such flit in the packet 502a is transmitted to crossbar port 112.

The engine 310 instructs the protocol engines 126a-b to enter viral mode (step 420), enters viral mode itself (step 408), and sets the viral bit in header flit 506a of the next packet 502b (step 410). The engine 310 may optionally set the poisoned bits of data flits 506b-f, although this is not required, because setting the viral bit of header flit 506a indicates that the entire packet 502b is corrupted or otherwise unusable. The protocol engines 126a-b and/or the engine 310 further sets the viral bit in header flit 508a of the next packet 502c.

Assume that the error condition ceases at the time that data flit 508d is received by protocol engines 126a-b. The protocol engines 126a-b therefore detect this termination of the error condition (step 288) and exit viral mode (step 289) prior to the transmission of the data flit 508d to the crossbar port 112. Further assume that no data or packet errors are identified in conjunction with flits 508d-f or 510a-f. As a result, the protocol engines 126a-b and/or the engine 310 clears the viral bit 510a of packet 502d before transmitting it to crossbar port 112.

Note that the viral bits of header flits 506a and 508a are set because a data error was identified in data flit 504d, not necessarily because a packet error was identified in either or both of packets 502b-c. FIG. 5 thereby illustrates an example in which the detection of a data error in a data flit of one packet causes the viral bits, to be set in subsequent packets.

One advantage of techniques disclosed herein is that they enable lockstepping errors to be signaled and contained in a system which uses a crossbar or other point-to-point communication mechanism. As described above, lockstepping errors may be signaled by setting the viral and/or poisoned bits of packets in which lockstepping errors have occurred. The process of setting such viral/poisoned bits operates to signal lockstepping errors because the existing crossbar protocol already dictates that viral packets and poisoned flits be treated as error signals by components which receive them. Furthermore, lockstepping error containment is achieved by continuing to set the viral/poisoned bits of subsequent packets/flits once a lockstepping error has been identified, thereby preventing a lockstepping error from propagating to subsequent packets/flits. Finally, this containment allows identification of other components within the system 100 that were possibly affected by the lockstep mismatch.

A related advantage of techniques disclosed herein is that they make use of existing features of the crossbar communication protocol—namely, the viral and poisoned bits—to signal and contain lockstepping errors. Previously, such bits were used to signal internal errors, such as protocol errors. The use of such bits to signal lockstepping errors enables such errors to be signaled and contained with minimal modification to the existing circuitry in the system and without requiring any modification to be made to the crossbar protocol. As a result, techniques disclosed herein may be implemented relatively quickly and inexpensively.

Another advantage of the techniques disclosed herein is that they may be used in conjunction with a crossbar having asynchronous point-to-point links and thereby avoid the need to comply with the tight timing requirements typically imposed by bus-based architectures on lockstepping circuitry. In particular, the XOR gate 306 and/or the error control and detection engine 310 may introduce delays into communications over the port 112 that would not be tolerated by a conventional shared bus. As a result, the lockstep logic 106 may be implemented more quickly, easily, and inexpensively than lockstep logic intended for use with a shared bus.

A further benefit of the loosened timing requirements typically associated with crossbars is that the data from the cores 102a-b may be latched for an arbitrary number of clock cycles (using, for example, latches 318a-b) inside the lockstep logic 106. Although such latching of data introduces a small delay when the lockstep logic 106 operates in lockstep mode, such a delay may enable the engine 310 to be implemented more simply and thereby reduce overall design cost.

Furthermore, shared system buses typically have a large number of external pins, often numbering in the hundreds, to which components (such as lockstepping circuitry) must be coupled. Designing and implementing the wiring for such circuitry can be time-consuming and costly. The crossbar port 112, in contrast, may have a relatively small number of bits (e.g., 32 for data and 10 for control), thereby simplifying the design and implemented of wiring for coupling the lockstep logic 106 to the port 112.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although the examples above include processor cores 102a-b operating in lockstep, the same techniques may be applied to processors or other circuitry operating in lockstep. The processor cores 102a-b, therefore, may therefore be characterized more generally as processing units.

Although the system 100 illustrated in FIG. 1 includes the crossbar 108, the crossbar 108 is merely one example of a point-to-point communications mechanism or other switching fabric that may be used in conjunction with embodiments of the present invention. As used herein the term "point-to-point communications mechanism" refers to any mechanism for establishing point-to-point links between pairs of devices over which such devices may communicate independently of communications conducted by other devices through the point-to-point communications mechanism.

Although six links 110a-f are shown in FIG. 1A, the crossbar 108 may have any number of links. The links 110a-f may be asynchronous with respect to the cores 102a-b; i.e., the links 110a-f and cores 102a-b may operate at different clock frequencies with respect to each other. Furthermore, the links 110a-f may be asynchronous with respect to each other. Although the lockstep logic 106 and crossbar 108 in FIG. 1A are on the same chip as the cores 102a-b, this is not a requirement of the present invention.

Although the XOR gate 306 is used in the embodiment illustrated in FIG. 3 to compare the outputs of the cores 102a-b, the XOR gate 306 is merely one example of a comparator. More generally, any component implementing any comparison function may be used to compare the outputs of the cores 102a-b.

Although various connections in the embodiments illustrated herein (such as lines 114a-b, 116a-b, and 118a-b) may be described above as individual lines, each such connection may include any number of lines, as may be necessary or desirable to carry associated signals. Furthermore, such connections may transmit signals serially or in parallel, using any communications protocol.

The lockstep logic 106 may be implemented in custom-designed analog or digital circuitry, application-specific integrated circuits (ASICs), field-programmable gate arrays (FPGAs), computer hardware, software, or firmware, or any combination thereof.

Although in the examples above, the use of individual viral/poisoned bits is described, more generally the viral/poisoned bits are merely examples of viral/poisoned indicators. Each such indicator may, for example, include multiple bits or be encoded in any other manner.

What is claimed is:

1. In a computer system including a plurality of processing units coupled over a system fabric, a method comprising steps of:
    (A) identifying a lockstep error associated with a first packet to be transmitted over the system fabric, comprising:
        (A) (1) receiving the packet from a first processing core, the first packet including a first header flit;
        (A) (2) receiving a second packet from a second processing core, the second packet including a second header flit;
        (A) (3) comparing the first header flit to the second header flit; and
        (A) (4) determining that the first header flit differs from the second header flit;
    (B) setting a viral indicator in the first packet to indicate the lockstep error; and
    (C) transmitting the modified packet over the system fabric.

2. The method of claim 1, wherein the plurality of processing units comprises a plurality of processors.

3. The method of claim 1, wherein the plurality of processing units comprises a plurality of processor cores.

4. The method of claim 1, wherein the system fabric comprises a crossbar.

5. The method of claim 1, wherein the step (B) comprises a step of setting the viral indicator in the first header flit.

6. The method of claim 1, wherein the viral indicator consists of a single viral bit.

7. In a computer system including a plurality of microprocessor cores coupled over a crossbar switch, a method comprising steps of:
    (A) receiving a first packet to be transmitted over the crossbar switch, the first packet including a first header flit;
    (B) receiving a second packet, the second packet including a second header flit;
    (C) determining whether the first header flit differs from the second header flit;
    (D) if the first header flit is determined to differ from the second header flit, setting a viral bit in the first header flit to indicate a lockstep error; and
    (E) transmitting the first packet over the crossbar switch.

8. A device for use in a computer system including a plurality of processing units coupled over a system fabric, the device comprising:
    means for identifying a lockstep error associated with a first packet to be transmitted over the system fabric, the means for identifying comprising:
        means for receiving the first packet, the first packet including a first header flit;
        means for receiving a second packet, the second packet including a second header flit;
        means for comparing the first header flit to the second header flit; and
        means for determining that the first header flit differs from the second header flit;
    means for setting a viral indicator in the first packet to indicate the lockstep error; and
    means for transmitting the modified packet over the system fabric.

9. The device of claim 8, wherein the means for setting comprises means for setting the viral indicator in the first header flit.

10. In a computer system including a plurality of processing units coupled over a system fabric, a method comprising steps of:
(A) identifying a lockstep error associated with a first packet to be transmitted over the system fabric, comprising:
(A) (1) receiving the first packet, the first packet including a first data flit;
(A) (2) receiving a second packet, the second packet including a second data flit;
(A) (3) comparing the first data flit to the second data flit; and
(A) (4) determining that the first data flit differs from the second data flit;
(B) setting a poisoned indicator in the first packet to indicate the lockstep error, and
(C) transmitting the modified packet over the system fabric.

11. The method of claim 10, wherein the plurality of processing units comprises a plurality of processors.

12. The method of claim 10, wherein the plurality of processing units comprises a plurality of processor cores.

13. The method of claim 10, wherein the system fabric comprises a crossbar.

14. The method of claim 10, wherein the step (B) comprises a step of setting the poisoned indicator in the first data flit.

15. The method of claim 10, wherein the poisoned indicator consists of a single poisoned bit.

16. In a computer system including a plurality of microprocessor cores coupled over a crossbar switch, a method comprising steps of:
(A) receiving a first packet to be transmitted over the crossbar switch, the first packet including a first data flit;
(B) receiving a second packet, the second packet including a second data flit;
(C) determining whether the first data flit differs from the second data flit;
(D) if the first data flit is determined to differ from the second data flit, setting a poisoned bit in the first data flit to indicate the lockstep error; and
(E) transmitting the first packet over the crossbar switch.

17. In a computer system including a plurality of processing units coupled over a system fabric, a method comprising steps of:
means for identifying a lockstep error associated with a first packet to be transmitted over the system fabric, the means for identifying comprising:
means for receiving the first packet, the first packet including a first data flit;
means for receiving a second packet, the second packet including a second data flit;
means for comparing the first data flit to the second data flit; and
means for determining that the first data flit differs from the second data flit;
means for setting a poisoned indicator in the first packet to indicate the lockstep error; and
means for transmitting the modified packet over the system fabric.

18. The device of claim 17, wherein the means for setting comprises means for setting the poisoned indicator in the first data flit.

19. In a computer system including a plurality of processing units coupled over a system fabric, a method comprising steps of:
(A) identifying a data error in a first data flit of a first packet to be transmitted over the system fabric; and (B) in response to identification of the data error, performing steps of:
(1) setting a poisoned indicator in the first data flit; and
(2) setting a viral indicator in a second packet to be transmitted over the system fabric.

20. The method of claim 19, wherein the first packet includes a first plurality of data flits including the first data flit, wherein the first plurality of data flits includes a second plurality of data flits occurring after the first data flit, and wherein the step (B) further comprises a step of:
(B) (3) setting poisoned indicators in the second plurality of data flits.

21. The method of claim 19, wherein the second packet comprises the next packet after the first packet in a packet stream to be transmitted over the system fabric.

22. The method of claim 19, wherein the step (B) (2) comprises a step of setting viral indicators in header flits of a plurality of packets after the first packet in a packet stream to be transmitted over the system fabric.

23. The method of claim 19, further comprising steps of:
(C) (1) transmitting the first packet over the system fabric; and
(C) (2) transmitting the second packet over the system fabric.

24. The method of claim 19, wherein the plurality of processing units comprises a plurality of processors.

25. The method of claim 19, wherein the plurality of processing units comprises a plurality of processor cores.

26. The method of claim 19, wherein the system fabric comprises a crossbar.

27. The method of claim 19, wherein the step (A) comprises steps of:
(A) (1) receiving the first packet, the first packet including the first data flit;
(A) (2) receiving the second packet, the second packet including a second data flit;
(A) (3) comparing the first data flit to the second data flit; and
(A) (4) determining that the first data flit differs from the second data flit.

28. The method of claim 19, wherein the poisoned indicator consists of a single poisoned bit, and wherein the viral indicator consists of a single viral bit.

29. In a computer system including a plurality of microprocessor cores coupled over a crossbar switch, a method comprising steps of:
(A) identifying a data error in a first data flit of a first packet to be transmitted over the system fabric, the first packet including a first plurality of data flits occurring before the first data flit and a second plurality of data flits occurring after the first data flit; and
(B) in response to identification of the data error, performing steps of:
(1) setting a poisoned bit in the first data flit;
(2) setting poisoned bits in the second plurality of data flits; and
(3) setting a viral bit in a second packet to be transmitted over the system fabric after the first packet.

30. A device for use in a computer system including a plurality of processing units coupled over a system fabric, the device comprising:
means for identifying a data error in a first data flit of a first packet to be transmitted over the system fabric; and means for setting a poisoned indicator in the first data flit and for setting a viral indicator in a second packet to be transmitted over the system fabric in response to identification of the data error.

31. The device of claim 30, wherein the first packet includes a first plurality of data flits including the first data flit, wherein the first plurality of data flits includes a second plurality of data flits occurring after the first data flit, and wherein the means for setting further comprises means for setting the poisoned indicators in the second plurality of data flits.

32. The device of claim 30, wherein the means for setting comprises means for setting viral indicators in header flits of a plurality of packets after the first packet in a packet stream to be transmitted over the system fabric.

33. In a computer system including a plurality of processing units coupled over a point-to-point communications mechanism, a method comprising steps of:
(A) identifying a lockstep error associated with a first packet to be transmitted over the point-to-point communications mechanism, comprising:
  (A) (1) receiving the first packet, the first packet including a first header flit;
  (A) (2) receiving a second packet, the second packet including a second header flit;
  (A) (3) comparing the first header flit to the second header flit; and
  (A) (4) determining that the first header flit differs from the second header flit;
(B) modifying a field in the first packet to indicate the lockstep error; and
(C) transmitting the modified packet over the point-to-point communications mechanism.

34. The method of claim 33, wherein the plurality of processing units comprises a plurality of processors.

35. The method of claim 33, wherein the plurality of processing units comprises a plurality of processor cores.

36. The method of claim 33, wherein the system fabric comprises a crossbar.

37. The method of claim 33, wherein the step (B) comprises a step of setting a viral bit in the first header flit.

38. The method of claim 33, wherein the step (A) comprises steps of:
(A) (1) receiving the first packet, the first packet including a first data flit;
(A) (2) receiving a second packet, the second packet including a second data flit;
(A) (3) comparing the first data flit to the second data flit; and
(A) (4) determining that the first data flit differs from the second data flit.

39. The method of claim 38, wherein the step (B) comprises a step of setting a poisoned bit in the first data flit.

40. The method of claim 39, further comprising a step of:
(D) in response to identification of the lockstep error associated with the first packet, setting a viral bit in a second packet to be transmitted over the system fabric.

41. A device for use in a computer system including a plurality of processing units coupled over a point-to-point communications mechanism, the device comprising:
means for identifying a lockstep error associated with a first packet to be transmitted over the point-to-point communications mechanism;
means for modifying a field in the first packet to indicate the lockstep error, the means for modifying comprising means for setting a viral bit in a header flit in the first packet; and
means for transmitting the modified packet over the point-to-point communications mechanism.

42. The device of claim 41, wherein the means for modifying comprises means for setting a poisoned bit in a data flit in the first packet.

43. The device of claim 42, wherein the means for modifying further comprises means for setting a viral bit in a header flit in a second packet to be transmitted over the system fabric.

44. A system comprising:
a first processing unit having a first output;
a second processing unit having a second output;
a system fabric having a port;
lockstep logic, coupled between the port and the first and second outputs, comprising:
  means for receiving a first packet from the first output;
  means for receiving a second packet from the second output;
  means for modifying a field in the first packet if the first packet is not equal to the second packet, the means for modifying comprising means for setting a viral indicator in a header flit in the first packet; and
  means for transmitting the first packet over the system fabric.

45. The device of claim 44, wherein the means for modifying comprises means for setting a poisoned indicator in a data flit in the first packet.

46. The device of claim 45, wherein the means for modifying further comprises means for setting a viral bit in a header flit in a second packet to be transmitted over the system fabric.

47. A device for use in a computer system including a plurality of processing units coupled over a point-to-point communications mechanism, the device comprising:
means for identifying a lockstep error associated with a first packet to be transmitted over the point-to-point communications mechanism;
means for modifying a field in the first packet to indicate the lockstep error, the means for modifying comprising means for setting a poisoned bit in a data flit in the first packet; and
means for transmitting the modified packet over the point-to-point communications mechanism.

48. A system comprising:
a first processing unit having a first output;
a second processing unit having a second output;
a system fabric having a port;
lockstep logic, coupled between the port and the first and second outputs, comprising:
  means for receiving a first packet from the first output;
  means for receiving a second packet from the second output;
  means for modifying a field in the first packet if the first packet is not equal to the second packet, the means for modifying comprising means for setting a poisoned indicator in a data flit in the first packet; and
  means for transmitting the first packet over the system fabric.

* * * * *

UNITED STATES PATENT AND TRADEMARK OFFICE
CERTIFICATE OF CORRECTION

PATENT NO. : 7,296,181 B2 Page 1 of 1
APPLICATION NO. : 10/818993
DATED : November 13, 2007
INVENTOR(S) : Kevin David Safford et al.

It is certified that error appears in the above-identified patent and that said Letters Patent is hereby corrected as shown below:

On the face page, in field (56), under "U.S. Patent Documents", in column 1, line 2, delete "5,223,152 A 6/1993 Freymeyer et al." and insert -- 5,226,152 7/1993 Klug et al. --, therefor.

In column 13, line 54, delete "Asia" and insert -- As a --, therefor.

In column 16, line 10, in Claim 1, after "the" insert -- first --.

In column 17, line 16, in Claim 10, after "error" delete "," and insert -- ; --, therefor.

Signed and Sealed this

Tenth Day of June, 2008

JON W. DUDAS
*Director of the United States Patent and Trademark Office*